United States Patent
Hsu et al.

(10) Patent No.: US 11,003,438 B2
(45) Date of Patent: May 11, 2021

(54) METHOD AND DEVICE FOR INCREMENTAL UPGRADE

(71) Applicants: Wistron NeWeb Corp., Hsinchu (TW); WebCom Communication (Kunshan) Corporation, KunShan (CN)

(72) Inventors: Wen-Jui Hsu, Hsinchu (TW); Yun-Pin Cheng, Hsinchu (TW); Shih-Wei Chi, Hsinchu (TW); Hong Sen Zhang, KunShan (CN); Jian-Yun Kong, KunShan (CN)

(73) Assignees: WISTRON NEWEB CORP., Hsinchu (TW); WEBCOM COMMUNICATION (KUNSHAN) CORPORATION, Kunshan (CN)

( * ) Notice: Subject to any disclaimer, the term of this patent is extended or adjusted under 35 U.S.C. 154(b) by 140 days.

(21) Appl. No.: 16/204,030

(22) Filed: Nov. 29, 2018

(65) Prior Publication Data
US 2019/0235859 A1  Aug. 1, 2019

(30) Foreign Application Priority Data
Jan. 26, 2018  (CN) .......................... 201810077283.8

(51) Int. Cl.
*G06F 8/658* (2018.01)
(52) U.S. Cl.
CPC .................... *G06F 8/658* (2018.02)
(58) Field of Classification Search
CPC ... G06F 8/65; G06F 8/658; G06F 8/63; G06F 3/04847
See application file for complete search history.

(56) References Cited

U.S. PATENT DOCUMENTS 8,305,591 B2 * 11/2012 Akiyoshi ........... H04N 1/00474
358/1.13
2002/0156863 A1 * 10/2002 Peng .................... G06F 16/9574
709/217

(Continued)

FOREIGN PATENT DOCUMENTS

| TW | I249705 B | 2/2006 |
|---|---|---|
| TW | I503747 B | 10/2015 |
| TW | I518595 B | 1/2016 |

*Primary Examiner* — Wei Y Zhen
*Assistant Examiner* — Brahim Bourzik
(74) *Attorney, Agent, or Firm* — McClure, Qualey & Rodack, LLP

(57) ABSTRACT

A method for incremental upgrade is provided. The method is used in a device and includes: receiving an incremental update package corresponding to an application, wherein the incremental update package at least includes an incremental and differential file and the size of a target-version file; obtaining idle resource of a memory in the device and a current-version file corresponding to the application; comparing the idle resource of the memory with a maximum upgrade resource requirement to choose an upgrade process for upgrading the application, wherein the maximum upgrade resource requirement is a capacity sum of the size of the current-version file, the size of the incremental and differential file, and the size of the target-version file; and restoring the target-version file according to the upgrade process, and installing the target-version file.

18 Claims, 9 Drawing Sheets

(56) References Cited

U.S. PATENT DOCUMENTS

| | | | | |
|---|---|---|---|---|
| 2004/0092255 A1* | 5/2004 | Ji | ............................ | G06F 8/658 |
| | | | | 455/419 |
| 2004/0098427 A1* | 5/2004 | Peng | ....................... | G06F 8/658 |
| 2007/0089108 A1* | 4/2007 | Chen | ......................... | G06F 8/65 |
| | | | | 717/168 |
| 2010/0030823 A1* | 2/2010 | Meller | .................... | G06F 8/654 |
| | | | | 707/E17.044 |
| 2010/0281208 A1* | 11/2010 | Yang | .................... | G06F 3/0616 |
| | | | | 711/103 |
| 2015/0007155 A1* | 1/2015 | Hoffman | ................... | G06F 8/65 |
| | | | | 717/168 |
| 2017/0322796 A1* | 11/2017 | Kim | ....................... | G06F 8/654 |

* cited by examiner

METHOD AND DEVICE FOR INCREMENTAL UPGRADE

CROSS REFERENCE TO RELATED APPLICATIONS

This application claims priority of Chinese Patent Application No. 201810077283.8 filed on Jan. 26, 2018 in the China Intellectual Property Office, the entire contents of which is hereby incorporated by reference.

BACKGROUND

Technical Field

The present disclosure generally relates to a method and a device for incremental upgrade. More specifically, aspects of the present disclosure relate to a method and a device for adaptive incremental upgrade based on memory capacity.

Description of the Related Art

The term "version upgrade" refers to an update for removing bugs in an operating system or an old version of a software application, or adding a new application function to software, to make said software more perfect and useful.

Currently, several methods are used to update software applications. The simplest of these is to distribute one entire software application to replace an older one. This method, called the "full update" method, is simple, but expensive and inconvenient.

Some software publishers distribute "incremental updates" in lieu of the full upgrade approach. These updates do not contain entire software applications, but rather only the information that is necessary to transform a given version of a software application into a newer version.

However, incremental upgrades have certain disadvantage, such as a high demand for device memory resources, so devices with low memory resources sacrifice upgrade time to solve the problem of using a lot of memory. However, for devices with sufficient memory resources, there is no need to sacrifice upgrade time. Therefore, how to adapt an incremental upgrade to the memory capacity of a specific device is an urgent problem that needs to be solved.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method for incremental upgrade is provided in the disclosure. The method comprises: receiving an incremental update package corresponding to an application, wherein the incremental update package at least comprises an incremental and differential file and the size of a target-version file; obtaining idle resource of a memory in the device and a current-version file corresponding to the application; comparing the idle resource of the memory with a maximum upgrade resource requirement to choose an upgrade process for upgrading the application, wherein the maximum upgrade resource requirement is a capacity sum of the size of the current-version file, the size of the incremental and differential file, and the size of the target-version file; and restoring the target-version file according to the upgrade process, and installing the target-version file.

A device for incremental upgrade is provided in the disclosure. The device comprises one or more processors and one or more computer storage media for storing one or more computer-readable instructions. The processor is configured to drive the computer storage media to execute the following tasks: receiving an incremental update package corresponding to an application, wherein the incremental update package at least comprises an incremental and differential file and the size of a target-version file; obtaining idle resource of a memory in the device and a current-version file corresponding to the application; comparing the idle resource of the memory with a maximum upgrade resource requirement to choose an upgrade process for upgrading the application, wherein the maximum upgrade resource requirement is a capacity sum of the size of the current-version file, the size of the incremental and differential file, and the size of the target-version file; and restoring the target-version file according to the upgrade process, and installing the target-version file.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
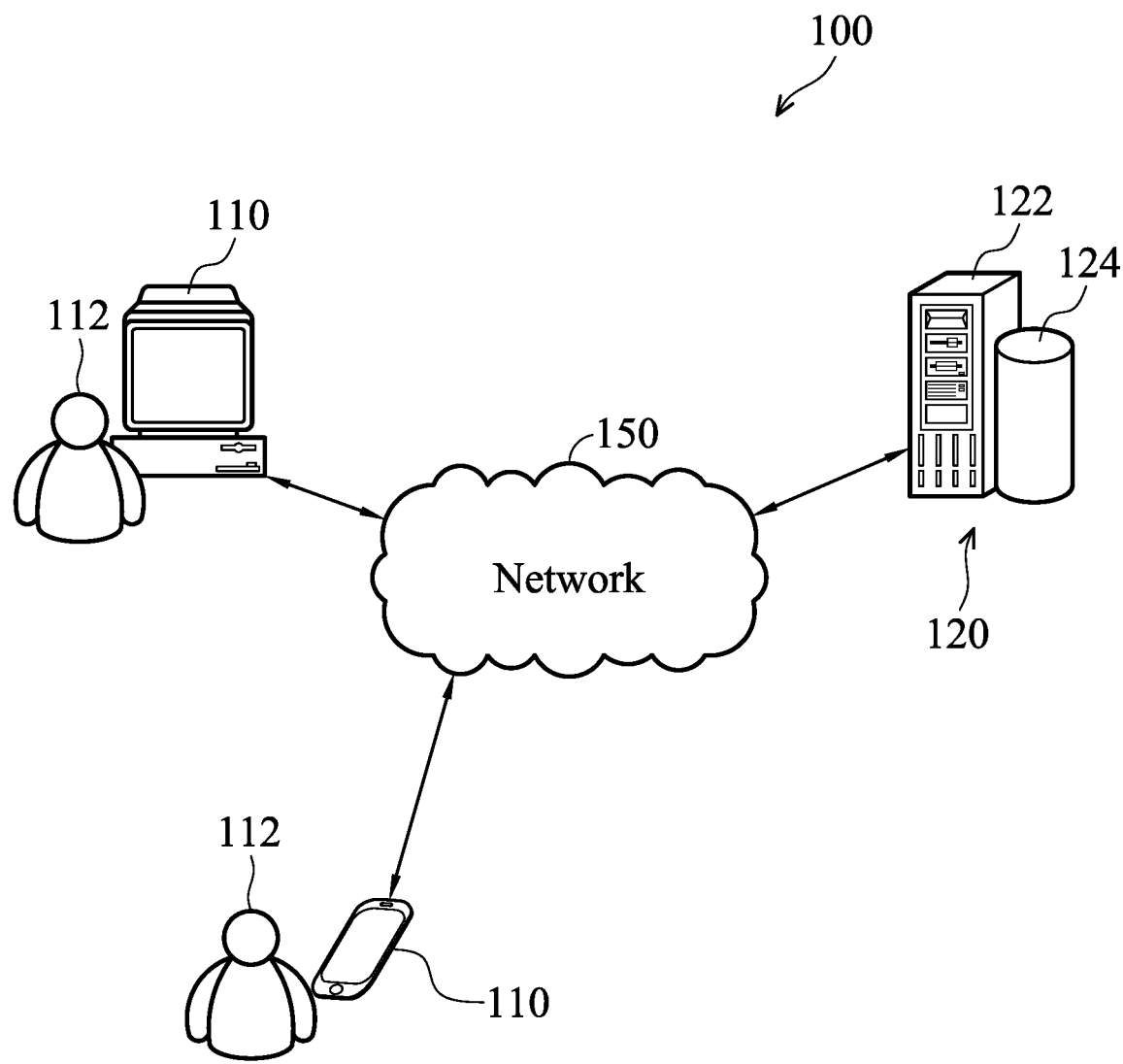
FIG. 1 shows a schematic diagram of a system for incremental upgrade according to one embodiment of the present disclosure.

FIG. 1 shows a schematic diagram of a system 100 for incremental upgrade according to one embodiment of the present disclosure. The system 100 may include an electronic device 110 that communicates with one or more server systems 120 through one or more networks 150. The electronic device 110 may include one or more of several types of electronic devices. Examples of electronic devices include desktop computers, laptop computers, smartphones, personal digital assistants (PDAs), tablet computers, and other suitable computer devices. The electronic device 110 may include one or more processors configured to execute instructions stored by a computer-readable medium for performing various device operations, such as input/output, communication, data processing, and the like.

The one or more server systems 120 may include one or more servers 122 (e.g., a server farm) including one or more processors configured to execute instructions stored by a computer-readable medium for performing various server operations. The one or more server systems 120 may also include one or more databases 124 provided as computer-readable memory for storing data. The networks 150 can be provided as wired and/or wireless networks, and may include a packet-based network, such as a TCP-IP network. The networks 150 may include a local area network (e.g., an intranet), a wireless local area network (WLAN) or Wi-Fi network, a Third Generation (3G) or Fourth Generation (4G) mobile telecommunications network, a wide area network, the Internet, or any appropriate combination thereof.

In general, the one or more server systems 120 can process and store data related to software application in database form. One example of data is an incremental update package corresponding to an application, wherein the incremental update package at least comprises an incremental and differential file and a file recording the size of a target-version file and a file check value. The electronic device 110 can be used by one or more users 112 to access data related to software application in the database. By way of non-limiting example, the user 112 can access the database using the electronic device 110 to download an incremental upgrade package installed in an application in the electronic device 110 in accordance with implementations of the present disclosure. After downloading the incremental upgrade package, the electronic device 110 can restore the incremental upgrade package and the current-version file of the application to obtain the target-version file of the application. Then, the electronic device 110 can install the target-version file of the application to complete the upgrade operation of the application from the current version to the target version.

For purposes of illustrating the present disclosure, a detailed description of a working example of the present disclosure is provided. In describing the method example, software updates may refer to a specific upgrade of a software application, e.g., an upgrade of a media player version 6.0 to media player version 7.0.

In addition, the electronic device 110 and the server system 120 shown in FIG. 1 is an example of one suitable system 100 for incremental upgrade architecture. Each of the components shown in FIG. 1 may be implemented via any type of electronic device, such as the electronic device 900 described with reference to FIG. 9, for example.

Figure 2:
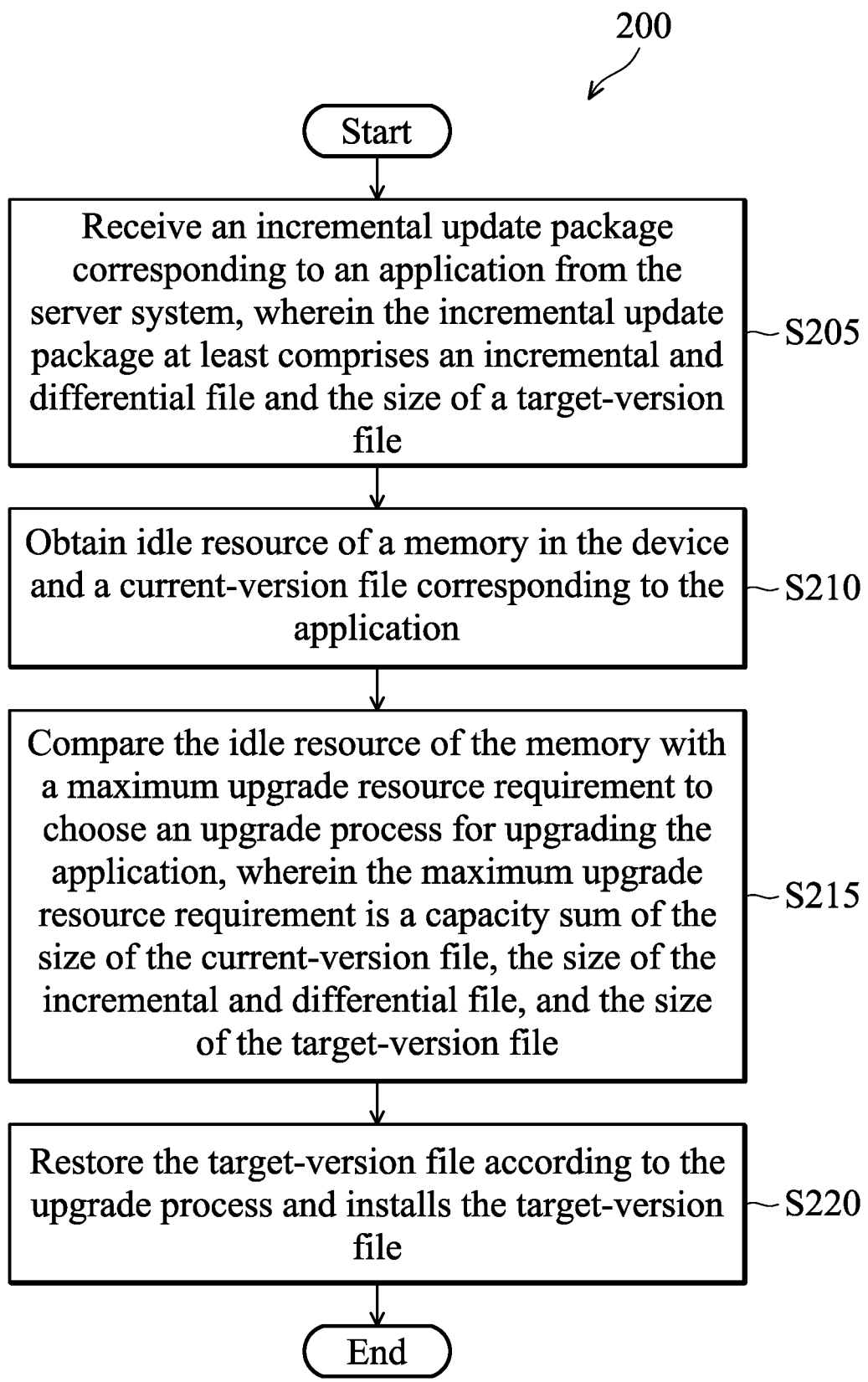
FIG. 2 is a flowchart illustrating a method for incremental upgrade according to an embodiment of the present disclosure.

FIG. 2 is a flowchart illustrating a method 200 for incremental upgrade according to an embodiment of the present disclosure. The method can be implemented in the processor of the electronic device 110 as shown in FIG. 1.

In step S205, the electronic device receives an incremental update package corresponding to an application from the server system, wherein the incremental update package at least comprises an incremental and differential file and the size of a target-version file. In step S210, the electronic device obtains idle resource of a memory in the device and a current-version file corresponding to the application. In step S215, the electronic device compares the idle resource of the memory with a maximum upgrade resource requirement to choose an upgrade process for upgrading the application, wherein the maximum upgrade resource requirement is a capacity sum of the size of the current-version file, the size of the incremental and differential file, and the size of the target-version file. In step S220, the electronic device restores the target-version file according to the upgrade process and installs the target-version file.

In step S215, how the electronic device compares the idle resources of the memory and the maximum upgrade resource requirements to determine the upgrade process for upgrading the application is described as follows.

Figure 3:
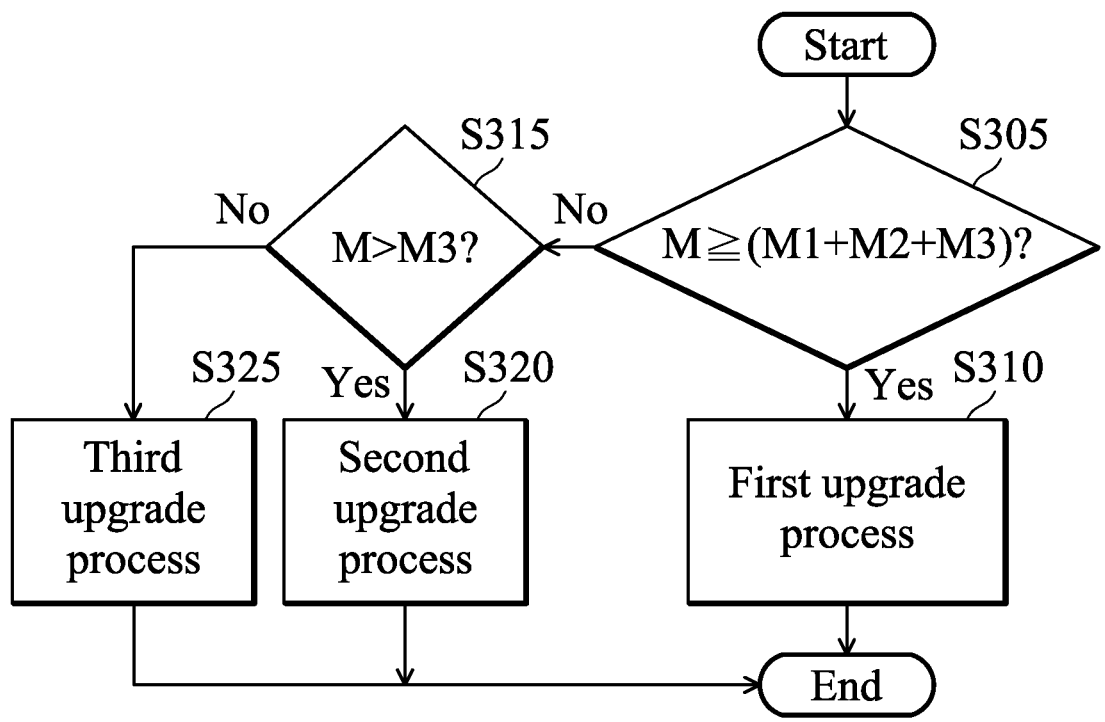
FIG. 3 is a flowchart illustrating an upgrade process for incremental upgrade according to an embodiment of the present disclosure.

FIG. 3 is a flowchart illustrating an upgrade process for incremental upgrade according to an embodiment of the present disclosure. The method can be implemented in the processor of the electronic device 110 as shown in FIG. 1.

FIG. 3 is a flow chart showing an upgrade process of the application determined by the electronic device according to an embodiment of the present disclosure. Before starting the process, the electronic device can first determine whether the read speed of the memory is faster than the write speed of the memory. When the electronic device determines that the read speed of the memory is faster than the write speed, the flow depicted in FIG. 3 is performed.

As shown in FIG. 3, in step S305, the electronic device determines whether the idle resource M of the memory is greater than or equal to the maximum upgrade resource requirement, wherein the maximum upgrade resource requirement is a capacity sum (M1+M2+M3) of the size of the current-version file M1 and the size of the incremental and differential file M2 and the size of the target-version file M3. When the electronic device determines that the idle resource of the memory is greater than or equal to the maximum upgrade resource requirement (i.e., M≥(M1+M2+ M3)) ("Yes" in step S305), in step S310, a first upgrade process is performed by the electronic device, as shown in FIG. 4.

Figure 4:
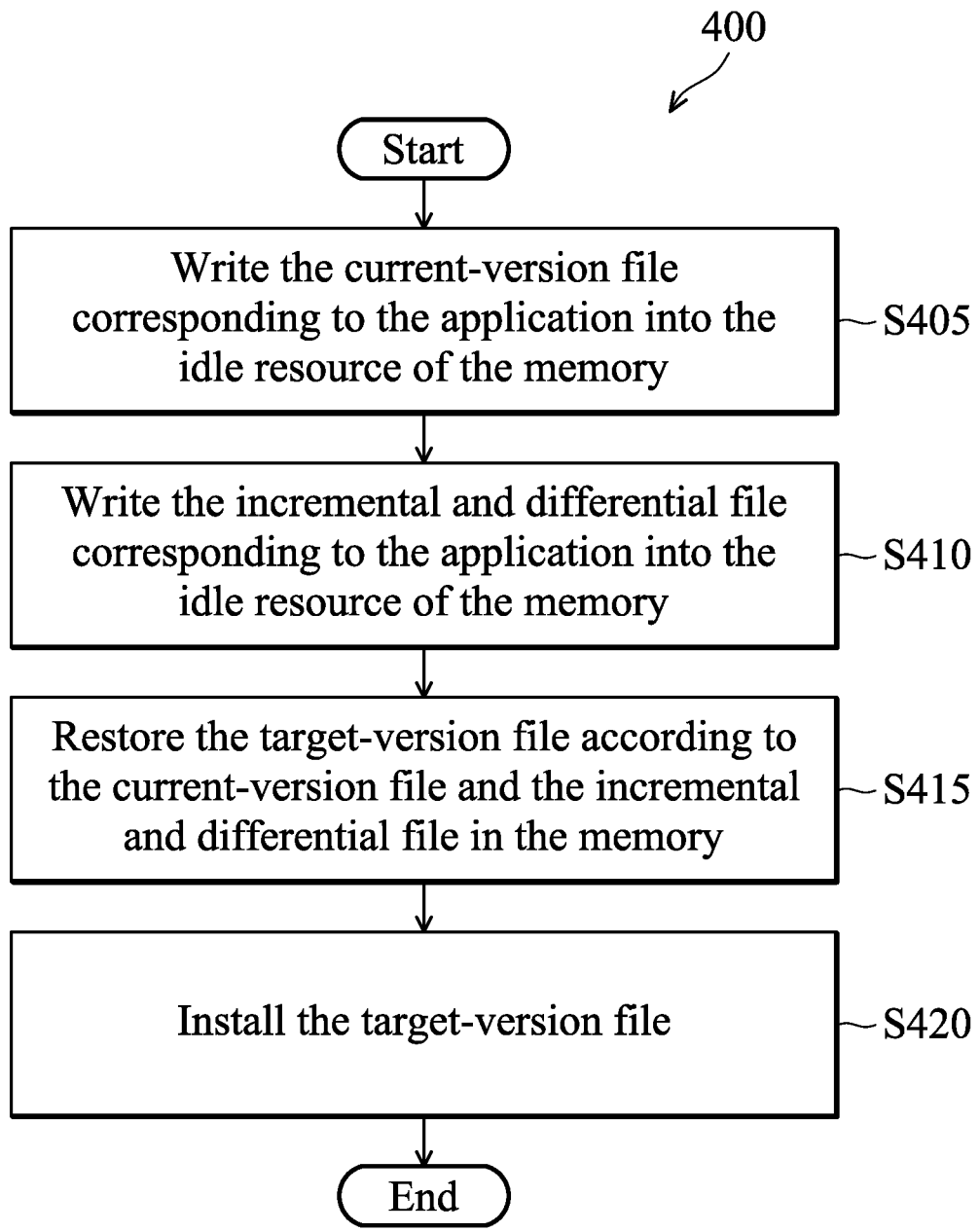
FIG. 4 is a flow chart showing a first upgrade process according to an embodiment of the present disclosure.

FIG. 4 is a flow chart showing a first upgrade process 400 according to an embodiment of the present disclosure. In step S405, the electronic device writes the current-version file corresponding to the application into the idle resource of the memory. In step S410, the electronic device writes the incremental and differential file corresponding to the application into the idle resource of the memory. In step S415, the electronic device restores the target-version file according to the current-version file and the incremental and differential file in the memory. In step S420, the electronic device installs the target-version file, and the upgrade of the application is completed.

Returning to FIG. 3, when the electronic device determines that the idle resource of the memory is less than the maximum upgrade resource requirement (i.e., M<(M1+M2+ M3)) ("No" in step S305), in step S315, the electronic device determines whether the idle resource M of the memory is greater than the size of the target-version file M3. When the electronic device determines that the idle resource M of the memory is greater than the size of the target-version file M3 (i.e., M>M3) ("Yes" in step S315), in step S320, a second upgrade process is performed by the electronic device, as shown in FIG. 5.

Figure 5:
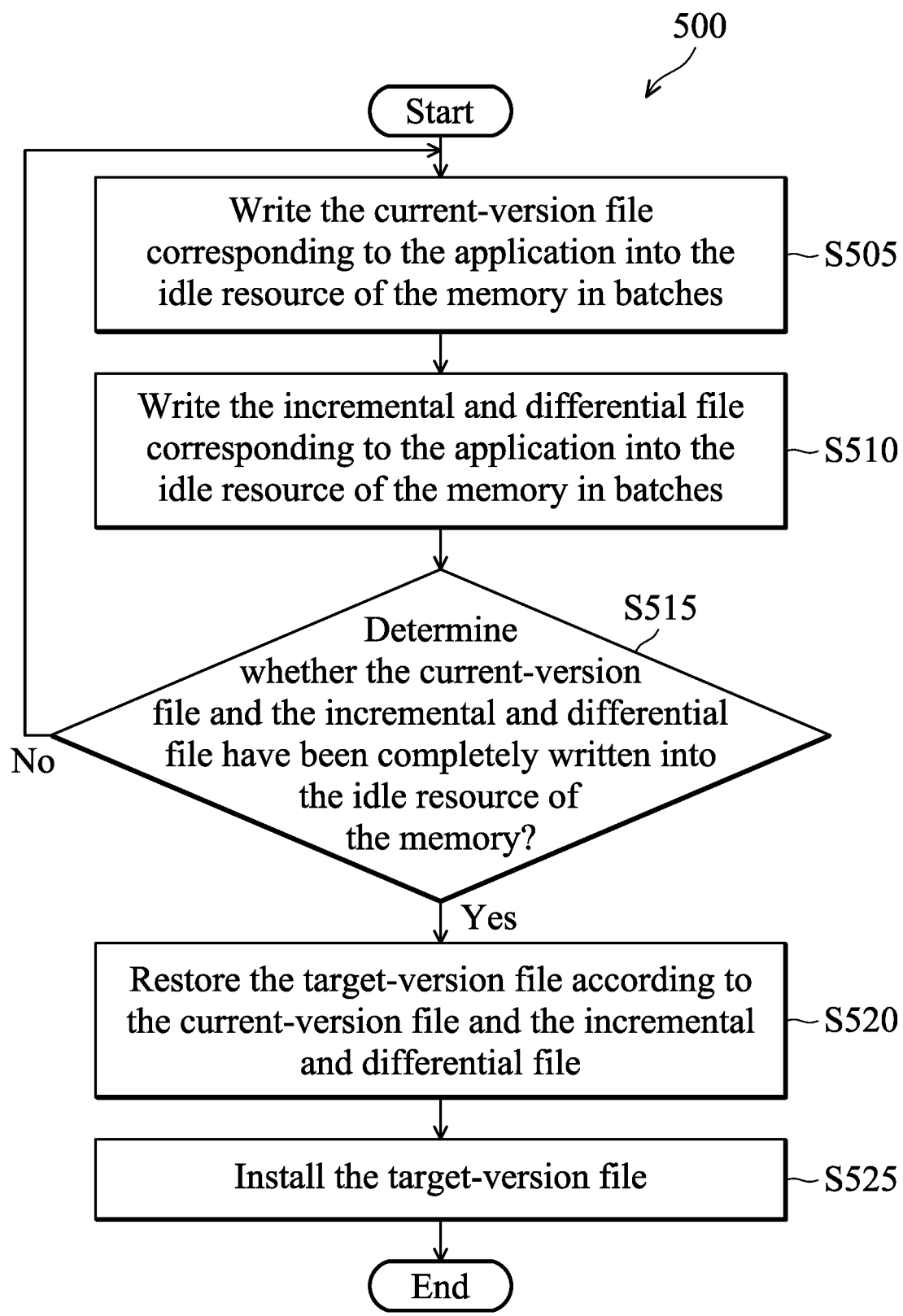
FIG. 5 is a flow chart showing a second upgrade process according to an embodiment of the present disclosure.

FIG. 5 is a flow chart showing a second upgrade process 500 according to an embodiment of the present disclosure. In step S505, the electronic device writes the current-version file corresponding to the application into the idle resource of the memory in batches. In step S510, the electronic device writes the incremental and differential file corresponding to the application into the idle resource of the memory in batches. For example, the electronic device writes only a portion, 128 bits, of the current-version file or the incremental and differential file into the idle resource of the memory at a time.

In step S515, the electronic device determines whether the current-version file and the incremental and differential file have been completely written into the idle resource of the memory. When the electronic device determines that the current-version file and the incremental and differential file have not been completely written into the idle resource of the memory ("No" in step S515), the process returns to step S505 and the electronic device continues to write the current-version file corresponding to the application into the idle resource of the memory in batches.

When the electronic device determines that the current-version file and the incremental and differential file have been completely written into the idle resource of the memory ("Yes" in step S515), in step S520, the electronic device restores the target-version file according to the current-version file and the incremental and differential file. In step S525, the electronic device installs the target-version file, and the upgrade of the application is completed.

Figure 6:
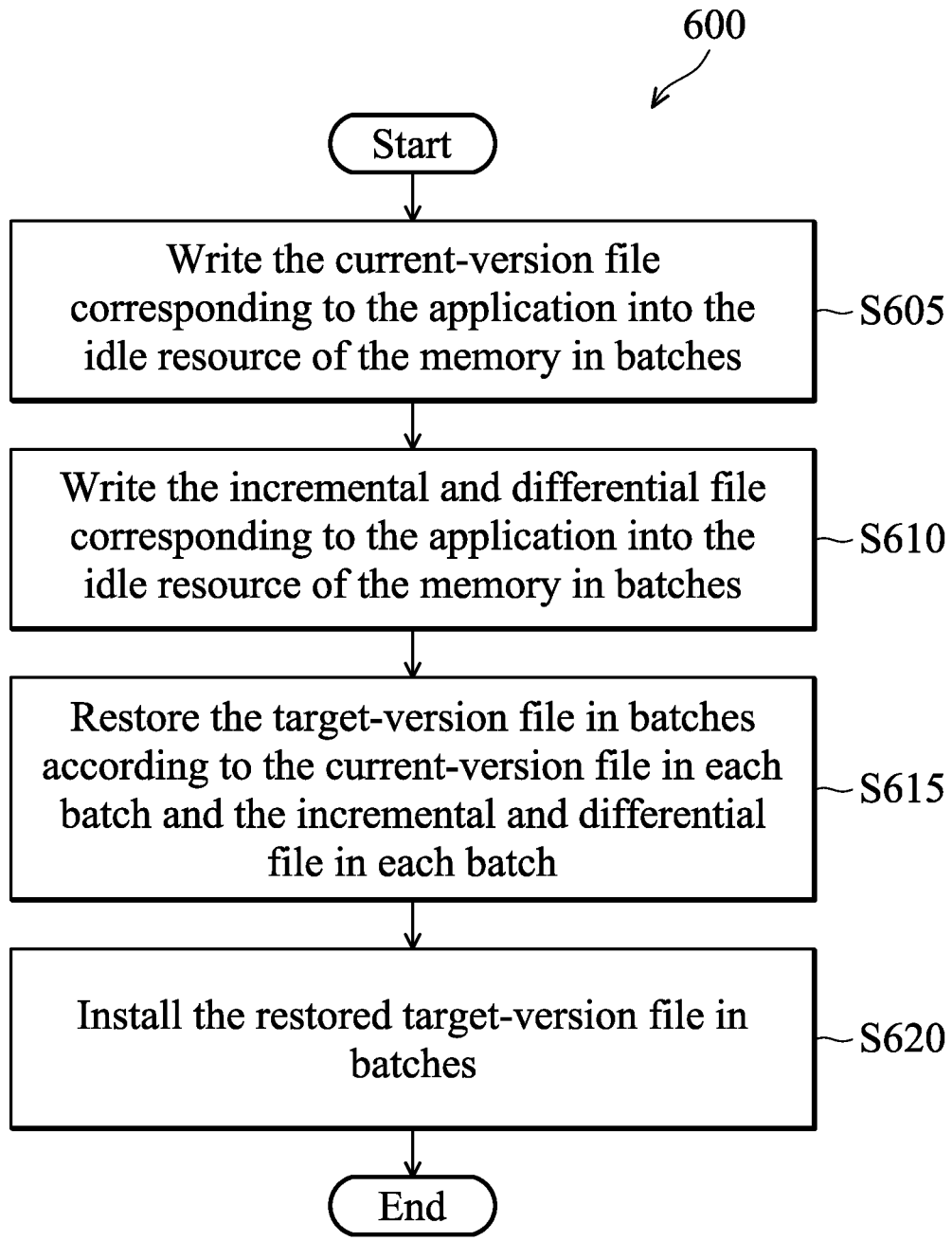
FIG. 6 is a flow chart showing a third upgrade process according to an embodiment of the present disclosure.

Returning to FIG. 3, when the electronic device determines that the idle resource M of the memory is not greater than the file capacity of the target-version file M3 (i.e., M M3) ("No" in step S315), a third upgrade process is performed by the electronic device in step S325, as shown in FIG. 6.

FIG. 6 is a flow chart showing a third upgrade process 600 according to an embodiment of the present disclosure. In step S605, the electronic device writes the current-version file corresponding to the application into the idle resource of the memory in batches. In step S610, the electronic device writes the incremental and differential file corresponding to the application into the idle resource of the memory in batches. In step S615, the electronic device restores the target-version file in batches according to the current-version file in each batch and the incremental and differential file in each batch. In step S620, the electronic device installs the restored target-version file in batches, and the upgrade of the application is completed. For example, the electronic device writes only a portion, 128 bits, of the current-version file or the incremental difference file into the idle resource of the memory at a time, and then restores and installs the portion, 128 bits, of the current-version file.

Figure 7:
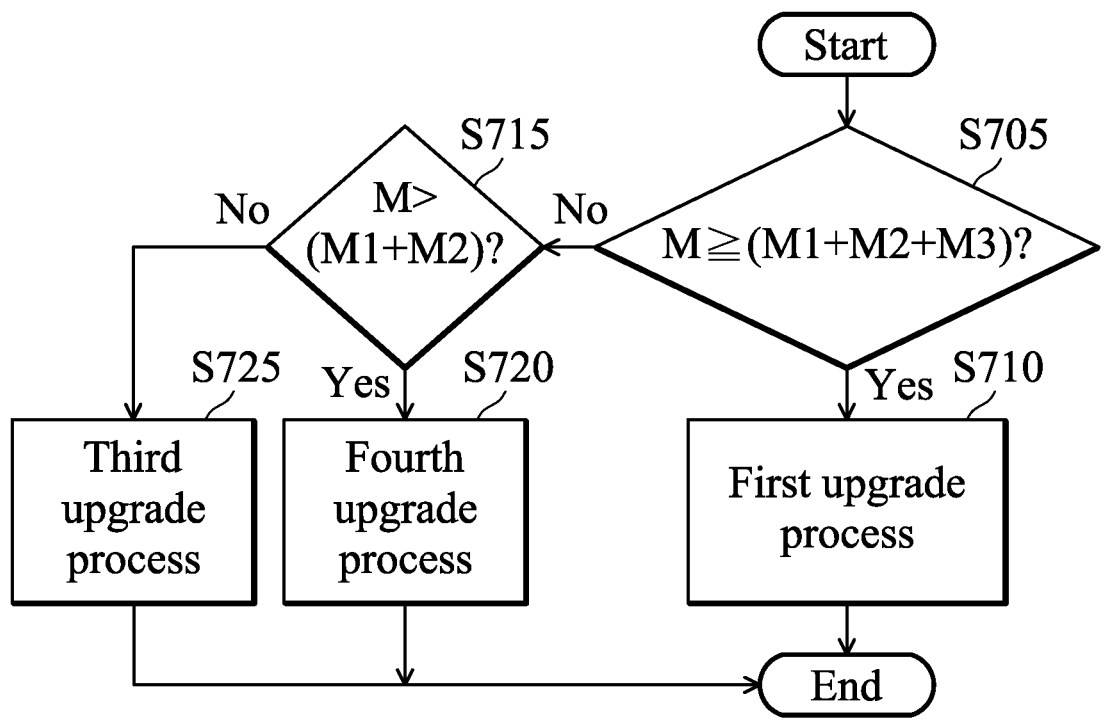
FIG. 7 is a flow chart showing an upgrade process of the application determined by the electronic device according to an embodiment of the present disclosure.

In another embodiment, when the electronic device determines that the write speed of the memory is faster than the read speed, the flow depicted in FIG. 7 is performed. FIG. 7 is a flow chart showing an upgrade process of the application determined by the electronic device according to an embodiment of the present disclosure.

As shown in FIG. 7, in step S705, the electronic device determines whether the idle resource M of the memory is greater than or equal to the maximum upgrade resource requirement, wherein the maximum upgrade resource requirement is a capacity sum (M1+M2+M3) of the size of the current-version file M1 and the size of the incremental and differential file M2 and the size of the target-version file M3. When the electronic device determines that the idle resource of the memory is greater than or equal to the maximum upgrade resource requirement (i.e., M≥(M1+M2+ M3)) ("Yes" in step S705), in step S710, the first upgrade process is performed by the electronic device, as shown in FIG. 4.

When the electronic device determines that the idle resource of the memory is less than the maximum upgrade resource requirement (i.e., M<(M1+M2+M3)) ("No" in step S705), in step S715, the electronic device determines whether the idle resource M of the memory is greater than the sum (M1+M2) of the size of the current-version file M1 and the size of the incremental and differential file M2. When the electronic device determines that the idle resource M of the memory is greater than the sum of the size of the current-version file and the size of the incremental and differential file (i.e., M>(M1+M2)) ("Yes" in step S715), in step S720, a fourth upgrade process is performed, as shown in FIG. 8.

Figure 8:
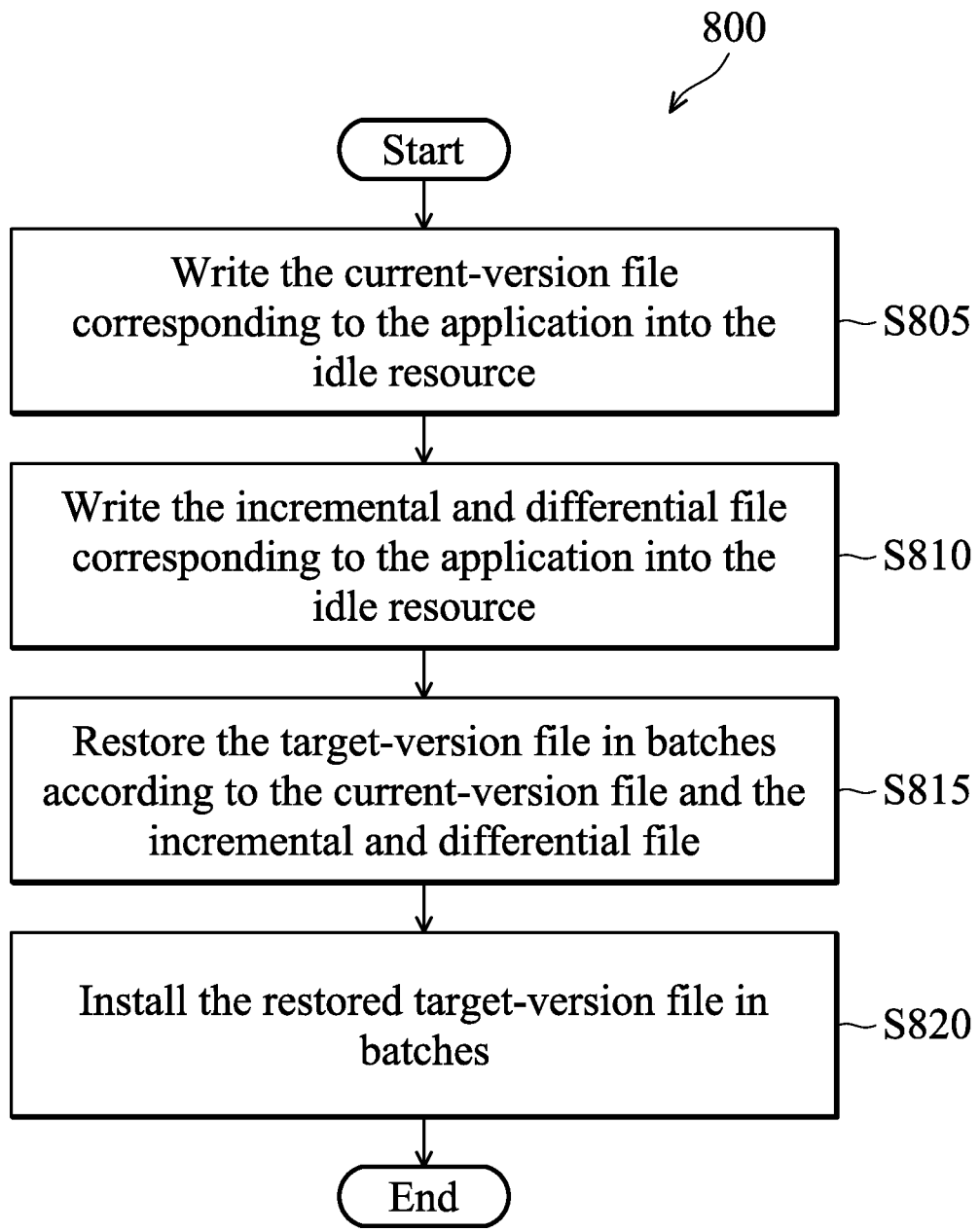
FIG. 8 is a flow chart showing a fourth upgrade process according to an embodiment of the present disclosure.

FIG. 8 is a flow chart showing a fourth upgrade process 800 according to an embodiment of the present disclosure. In step S805, the electronic device writes the current-version file corresponding to the application into the idle resource. In step S810, the electronic device writes the incremental and differential file corresponding to the application into the idle resource. In step S815, the electronic device restores the target-version file in batches according to the current-version file and the incremental and differential file. In step S820, the electronic device installs the restored target-version file in batches, and the upgrade of the application is completed. For example, the electronic device restores and installs only a portion, 128 bits, of the restored target-version file.

Returning to FIG. 7, when the electronic device determines that the idle resource M of the memory is not greater than the sum of the size of the current-version file and the size of the incremental and differential file (i.e., M≤(M1+

M2)), ("No" in step S715), in step S725, the third upgrade process is performed, as shown in FIG. 6.

In an embodiment, after the electronic device restores the target-version file according to the upgrade process, the electronic device may further examine whether the restored target-version file is correct according to the file check value included in the incremental upgrade package. In more detail, the electronic device can calculate a target check value of the restored target-version file and compare the target check value with the file check value in the incremental upgrade package. When the target check value is the same as the file check value, the electronic device determines that the restored target-version file is correct. When the target check value is different from the file check value, the electronic device determines that the restored target-version file is incorrect, stops the upgrade process, and transmits a notification to notify the user that the upgrade process is failed.

Figure 9:
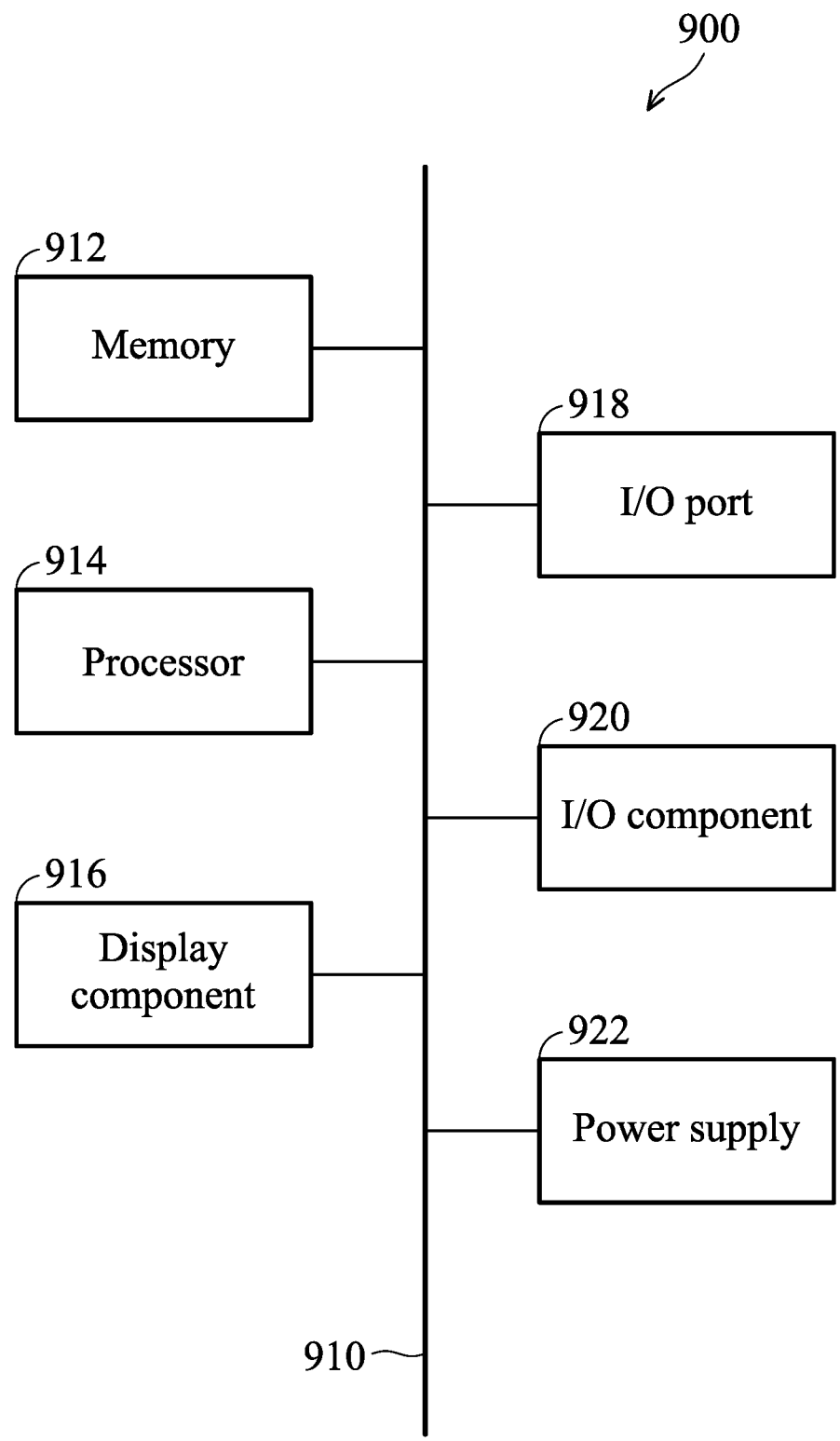
FIG. 9 illustrates an exemplary operating environment for implementing embodiments of the present disclosure.

Having described embodiments of the present disclosure, an exemplary operating environment in which embodiments of the present disclosure may be implemented is described below. Referring to FIG. 9, an exemplary operating environment for implementing embodiments of the present disclosure is shown and generally known as an electronic device 900. The electronic device 900 is merely an example of a suitable computing environment and is not intended to limit the scope of use or functionality of the disclosure. Neither should the electronic device 900 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 9, the electronic device 900 may include a bus 910 that is directly or indirectly coupled to the following devices: one or more memories 912, one or more processors 914, one or more display components 916, one or more input/output (I/O) ports 918, one or more input/output components 920, and an illustrative power supply 922. The bus 910 may represent one or more kinds of busses (such as an address bus, data bus, or any combination thereof). Although the various blocks of FIG. 9 are shown with lines for the sake of clarity, and in reality, the boundaries of the various components are not specific. For example, the display component such as a display device may be considered an I/O component and the processor may include a memory.

The electronic device 900 typically includes a variety of computer-readable media. The computer-readable media can be any available media that can be accessed by electronic device 900 and includes both volatile and nonvolatile media, removable and non-removable media. By way of example, but not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the electronic device 900. The computer storage media may not comprise signal per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 912 may include computer-storage media in the form of volatile and/or nonvolatile memory. The memory may be removable, non-removable, or a combination thereof. Exemplary hardware devices include solid-state memory, hard drives, optical-disc drives, etc. The electronic device 900 includes one or more processors that read data from various entities such as the memory 912 or the I/O components 920. The display component(s) 916 present data indications to a user or other device. Exemplary presentation components include a display device, speaker, printing component, vibrating component, etc.

The I/O ports 918 allow the electronic device 900 to be logically coupled to other devices including the I/O components 920, some of which may be embedded. Illustrative components include a microphone, joystick, game pad, satellite dish, scanner, printer, wireless device, etc. The I/O components 920 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the electronic device 900, or any combination of. The electronic device 900 may be equipped with depth cameras, such as stereoscopic camera systems, infrared camera systems, RGB camera systems, any combination of thereof to realize gesture detection and recognition. Furthermore, the electronic device 900 may be equipped with accelerometers or gyroscopes that enable detection of motion. The output of the accelerometers or gyroscopes may be provided to the display of the computing device 700 to carry out immersive augmented reality or virtual reality.

Furthermore, the processor 914 in the electronic device 900 can execute the program code in the memory 912 to perform the above-described actions and steps or other descriptions herein.

As described above, since the method and device for incremental upgrade provided in the present disclosure further consider the idle resource of the memory, the utilization of the idle resource of the memory can be improved to optimize the time of incremental upgrade of the device.

In addition, in the above exemplary device, although the method has been described on the basis of the flow diagram using a series of steps or blocks, the present invention is not limited to this sequence of steps, and some of the steps may be performed in a different order than that of the remaining steps, or they may be performed simultaneously with the remaining steps. For example, the electronic device may first write the incremental and differential file corresponding to the application into the idle resource of the memory, and then write the current-version file corresponding to the application into the idle resource of the memory. In another example, the electronic device can simultaneously write the current-version file and the incremental and differential file corresponding to the application into the idle resource of the memory in batches. Furthermore, those skilled in the art will understand that the steps shown in the flow diagram are not exclusive and they may include other steps or one or more steps of the flow diagram may be deleted without affecting the scope of the present invention.

Use of ordinal terms such as "first," "second," "third," "fourth," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for incremental upgrade, used in a device, comprising:
   receiving an incremental update package corresponding to an application, wherein the incremental update package at least comprises an incremental and differential file and a size of a target-version file;
   obtaining idle resource of a memory in the device and a current-version file corresponding to the application;
   comparing the idle resource of the memory with a maximum upgrade resource requirement to choose an upgrade process for upgrading the application, wherein the maximum upgrade resource requirement is a capacity sum of a size of the current-version file, a size of the incremental and differential file, and the size of the target-version file; and
   restoring the target-version file according to the upgrade process, and installing the target-version file,
   wherein the step of comparing the idle resource of the memory with the maximum upgrade resource requirement to choose the upgrade process for upgrading the application further comprises:
   determining whether the idle resource of the memory is greater than or equal to the maximum upgrade resource requirement;
   performing a first upgrade process in response to determining that the idle resource of the memory is greater than or equal to the maximum upgrade resource requirement;
   determining whether the idle resource of the memory is greater than the size of the target-version file in response to determining that the idle resource of the memory is less than the maximum upgrade resource requirement;
   performing a second upgrade process in response to determining that the idle resource of the memory is larger than only the size of the target-version file; and
   performing a third upgrade process in response to determining that the idle resource of the memory is not greater than only the size of the target-version file.

2. The method for incremental upgrade as claimed in claim 1, wherein a read speed of the memory is faster than a write speed of the memory.

3. The method for incremental upgrade as claimed in claim 1, wherein the first upgrade process comprises:
   writing the current-version file corresponding to the application into the idle resource of the memory;
   writing the incremental and differential file corresponding to the application into the idle resource of the memory; and
   restoring the target-version file according to the current-version file and the incremental and differential file.

4. The method for incremental upgrade as claimed in claim 2, wherein the second upgrade process comprises:
   writing the current-version file corresponding to the application into the idle resource of the memory in batches;
   writing the incremental and differential file corresponding to the application into the idle resource of the memory in batches; and
   restoring the target-version file according to the current-version file and the incremental and differential file in response to determining that the current-version file and the incremental and differential file have been completely written into the idle resource of the memory.

5. The method for incremental upgrade as claimed in claim 2, wherein the third upgrade process comprises:
   writing the current-version file corresponding to the application into the idle resource of the memory in batches;
   writing the incremental and differential file corresponding to the application into the idle resource of the memory in batches; and
   restoring the target-version file in batches according to the current-version file in each batch and the incremental and differential file in each batch.

6. The method for incremental upgrade as claimed in claim 1, further comprising:
   determining whether the idle resource of the memory is greater than a sum of the size of the current-version file and the size of the incremental and differential file in response to determining that the idle resource of the memory is less than the maximum upgrade resource requirement;
   performing a fourth upgrade process in response to determining that the idle resource of the memory is greater than the sum of the size of the current-version file and the size of the incremental and differential file; and
   performing a third upgrade process in response to determining that the idle resource of the memory is not greater than the sum of the size of the current-version file and the size of the incremental and differential file size;
wherein a write speed of the memory is faster than a read speed of the memory.

7. The method for incremental upgrade as claimed in claim 6, wherein the fourth upgrade process further comprises:
    writing the current-version file corresponding to the application into the idle resource of the memory;
    writing the incremental and differential file corresponding to the application into the idle resource of the memory; and
    restoring the target-version file in batches according to the current-version file and the incremental and differential file.

8. The method for incremental upgrade as claimed in claim 6, wherein the third upgrade process further comprises:
    writing the current-version file corresponding to the application into the idle resource of the memory in batches;
    writing the incremental and differential file corresponding to the application into the idle resource of the memory in batches; and
    restoring the target-version file in batches according to the current-version file in each batch and the incremental and differential file in each batch.

9. The method for incremental upgrade as claimed in claim 1, wherein the incremental upgrade package further comprises a file check value, and the step of restoring the target-version file according to the upgrade process further comprises:
    examining whether the restored target-version file is correct according to the file check value; and
    the upgrade process is stopped when an examination reveals that the restored target-version file is incorrect.

10. A device for incremental upgrade, comprising:
    one or more processors; and
    one or more computer storage media for storing one or more computer-readable instructions, wherein the processor is configured to drive the computer storage media to execute the following tasks:
    receiving an incremental update package corresponding to an application, wherein the incremental update package at least comprises an incremental and differential file and a size of a target-version file;
    obtaining idle resource of a memory in the device and a current-version file corresponding to the application;
    comparing the idle resource of the memory with a maximum upgrade resource requirement to choose an upgrade process for upgrading the application, wherein the maximum upgrade resource requirement is a capacity sum of a size of the current-version file, a size of the incremental and differential file, and the size of the target-version file; and
    restoring the target-version file according to the upgrade process, and installing the target-version file,
    wherein the processor comparing the idle resource of the memory with the maximum upgrade resource requirement to choose the upgrade process for upgrading the application further executes the following tasks:
    determining whether the idle resource of the memory is greater than or equal to the maximum upgrade resource requirement;
    performing a first upgrade process in response to determining that the idle resource of the memory is greater than or equal to the maximum upgrade resource requirement;
    determining whether the idle resource of the memory is greater than the size of the target-version file in response to determining that the idle resource of the memory is less than the maximum upgrade resource requirement;
    performing a second upgrade process in response to determining that the idle resource of the memory is larger than only the size of the target-version file; and
    performing a third upgrade process in response to determining that the idle resource of the memory is not greater than only the size of the target-version file.

11. The device for incremental upgrade as claimed in claim 10,
    wherein a read speed of the memory is faster than a write speed of the memory.

12. The device for incremental upgrade as claimed in claim 10, wherein the first upgrade process performed by the processor comprises:
    writing the current-version file corresponding to the application into the idle resource of the memory;
    writing the incremental and differential file corresponding to the application into the idle resource of the memory; and
    restoring the target-version file according to the current-version file and the incremental and differential file.

13. The device for incremental upgrade as claimed in claim 11, wherein the second upgrade process performed by the processor comprises:
    writing the current-version file corresponding to the application into the idle resource of the memory in batches;
    writing the incremental and differential file corresponding to the application into the idle resource of the memory in batches; and
    restoring the target-version file according to the current-version file and the incremental and differential file in response to determining that the current-version file and the incremental and differential file have been completely written into the idle resource of the memory.

14. The device for incremental upgrade as claimed in claim 11, wherein the third upgrade process performed by the processor comprises:
    writing the current-version file corresponding to the application into the idle resource of the memory in batches;
    writing the incremental and differential file corresponding to the application into the idle resource of the memory in batches; and
    restoring the target-version file in batches according to the current-version file in each batch and the incremental and differential file in each batch.

15. The device for incremental upgrade as claimed in claim 10, wherein the processor further executes the following tasks:
    determining whether the idle resource of the memory is greater than a sum of the size of the current-version file and the size of the incremental and differential file in response to determining that the idle resource of the memory is less than the maximum upgrade resource requirement;
    performing a fourth upgrade process in response to determining that the idle resource of the memory is greater than the sum of the size of the current-version file and the size of the incremental and differential file; and performing a third upgrade process in response to determining that the idle resource of the memory is not greater than the sum of the size of the current-version file and the size of the incremental and differential file size;

wherein a write speed of the memory is faster than a read speed of the memory.

16. The device for incremental upgrade as claimed in claim 15, wherein the fourth upgrade process performed by the processor comprises:

writing the current-version file corresponding to the application into the idle resource of the memory;

writing the incremental and differential file corresponding to the application into the idle resource of the memory; and restoring the target-version file in batches according to the current-version file and the incremental and differential file.

17. The device for incremental upgrade as claimed in claim 15, wherein the third upgrade process performed by the processor comprises:

writing the current-version file corresponding to the application into the idle resource of the memory in batches;

writing the incremental and differential file corresponding to the application into the idle resource of the memory in batches; and restoring the target-version file in batches according to the current-version file in each batch and the incremental and differential file in each batch.

18. The device for incremental upgrade as claimed in claim 10, wherein the incremental upgrade package further comprises a file check value, and the processor restoring the target-version file according to the upgrade process further comprises:

examining whether the restored target-version file is correct according to the file check value; and the upgrade process is stopped when an examination reveals that the restored target-version file is incorrect.

* * * * *